United States Patent
Chisholm et al.

(10) Patent No.: US 6,998,425 B2
(45) Date of Patent: Feb. 14, 2006

(54) UV CURABLE COATING COMPOSITIONS AND USES THEREOF

(75) Inventors: Bret Ja Chisholm, Clifton Park, NY (US); James Norman Cawse, Pittsfield, MA (US); Chris Anthony Molaison, Albany, NY (US); Michael Jorlath Brennan, Jr., Locust Grove, VA (US)

(73) Assignee: General Electric Company, Niskayuna, NY (US)

( * ) Notice: Subject to any disclaimer, the term of this patent is extended or adjusted under 35 U.S.C. 154(b) by 33 days.

(21) Appl. No.: 10/747,713

(22) Filed: Dec. 23, 2003

(65) Prior Publication Data

US 2005/0136252 A1    Jun. 23, 2005

(51) Int. Cl.
*C08F 2/48*    (2006.01)

(52) U.S. Cl. .............................. 522/182; 522/7; 522/13; 522/15; 522/17; 522/18; 522/21; 522/31; 522/42; 522/46; 522/64

(58) Field of Classification Search ................ 522/181, 522/182, 7, 13, 15, 17, 18, 21, 31, 42, 46, 522/64, 173, 179; 428/352, 354
See application file for complete search history.

(56) References Cited

U.S. PATENT DOCUMENTS

| | | |
|---|---|---|
| 4,198,465 A | 4/1980 | Moore et al. |
| 4,455,205 A | 6/1984 | Olson et al. |
| 4,477,529 A | 10/1984 | Campbell |
| 4,478,876 A | 10/1984 | Chung |
| 4,528,311 A | 7/1985 | Beard et al. |
| 5,227,240 A | 7/1993 | Tilley et al. |
| 5,804,301 A * | 9/1998 | Curatolo ............ 428/352 |
| 5,977,200 A | 11/1999 | Lake |
| 6,538,725 B1 | 3/2003 | Potyrailo et al. |

* cited by examiner

*Primary Examiner*—Robert D. Harlan
(74) *Attorney, Agent, or Firm*—Shawn A. McClintic; William E. Powell, III (57) ABSTRACT

The present invention is directed to curable acrylate coating compositions and coated articles resulting therefrom. The curable acrylate coating composition comprises at least two polyfunctional acrylate derivatives, at least one photoinitiator and at least one nanoscale filler.

33 Claims, 2 Drawing Sheets

UV CURABLE COATING COMPOSITIONS AND USES THEREOF

STATEMENT REGARDING FEDERALLY SPONSORED RESEARCH AND DEVELOPMENT

The United States Government may have certain rights in this invention pursuant to contract number 70NANB9H3038 awarded by the United States Department of National Institute of Standards and Technology.

BACKGROUND OF THE INVENTION

This invention relates to cured coatings, and more particularly to curable acrylate coating compositions, their use, and coated articles resulting therefrom.

Coating polymeric resin substrates such as, for example, articles of molded polycarbonate, polyester, polyurethane and the like to improve their resistance to weathering is an accepted procedure. Such coatings may include radiation curable polyacrylic or polyacrylic-urethane coatings.

Conventionally cured hardcoat finishes have several disadvantages. In general, the coating materials and the curing agent must be applied separately, in a particular sequence and at particular relative levels as both the proportions of the ingredients and the timing of their application is critical. Therefore conventionally cured hardcoats have been difficult and costly to apply, especially with the consistency and uniformity required in current commercial applications. Curable coatings have been used to try and overcome several of those disadvantages. In particular, curable coating compositions may be premixed, e.g. the polymerization initiator may be added to the active ingredients when the coating is produced, and not by the user when the coating is applied. Thus, mixing and measurement errors can be avoided and a more consistent product can be obtained.

However the curable coating compositions themselves pose various problems. For example, typical UV hardcoats are high molecular weight, highly crosslinked films, which are formed from the highly reactive acrylate functionality. As such, known UV hardcoats have suffered from limited durability, and their low solids content and cured resin shrinkage. Also high amounts of UV light are required to cure. In addition the hardcoats formulated in an attempt to overcome these problems typically suffer from some combination of loss of abrasion and scratch resistance, poor adhesion, poor processibility and unsatisfactory durability.

A need therefore exists for a curable product which is conveniently processable and which forms cured coatings exhibiting improved physical and chemical properties, e.g. scratch and abrasion resistance, adhesion and durability. The present invention provides novel solutions to these and similar problems associated with the method of making and use of curable coatings.

BRIEF DESCRIPTION OF THE INVENTION

The present invention is directed to curable acrylate coating compositions comprising at least two polyfunctional acrylate derivatives, a photoinitiator, and a nanoscale filler. The present invention is also directed to articles coated with such a coating.

The coating of the present invention may also comprise additional components such as solvents, UV absorbers and the like.

Various other features, aspects, and advantages of the present invention will become more apparent with reference to the following description, examples, and appended claims.

DETAILED DESCRIPTION OF THE INVENTION

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

Each of the ranges presented in this disclosure may also include any subset of ranges included herein.

The curable acrylate coating composition according to the present invention comprises at least two polyfunctional acrylate derivatives, at least one solvent, at least one photoinitiator and at least one nanoscale filler. The curable acrylate coating composition provide coatings possessing adhesion, abrasion resistance, good weather and thermal crack resistance.

The polyfunctional acrylate derivatives may be selected from the group consisting of any monomeric or oligomeric molecule possessing acrylic, methacrylic, ethacrylic, and the like, having a functionality equal to or greater than two. Preferably, the acrylate derivatives are selected from the group consisting of hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, difunctional urethane acrylates, tetraacrylate monomer, polyester acrylate oligomers, and combinations thereof. In one embodiment of the present invention the polyfunctional acrylate derivative is a hexafunctional urethane acrylate. In another embodiment of the present invention the polyfunctional acrylate derivative may be a low molecular weight acrylate such as but not limited to pentaerythritol triacrylate, trimethylolpropane triacrylate, butanediol diacrylate and combinations thereof.

In one embodiment, the first polyfunctional acrylate derivative is hexafunctional urethane acrylate and a second polyfunctional acrylate derivative is selected from the group of pentaerythritol triacrylate, trimethylolpropane triacrylate, or butanediol diacrylate.

Typically, the total amount of all polyfunctional acrylates present in the cured acrylate coating composition of the present invention is in the range of between about 30 weight percent and about 95 weight percent of the curable acrylate coating composition, or any range therebetween. Alternatively, in one embodiment of the present invention the total amount of all polyfunctional acrylates present in the cured acrylate coating composition of the present invention is in the range of between about 50 weight percent and about 90 weight percent of the curable acrylate coating composition. In yet another embodiment the total amount of all polyfunctional acrylates present in the cured acrylate coating composition of the present invention is in the range of between about 70 and about 80 weight % of the curable acrylate coating composition.

In one embodiment of the present invention, the polyfunctional acrylate is a hexafunctional acrylate derivative. Preferably the hexafunctional acrylate derivative is present in an amount of between about 0.1 weight percent and about 80 weight percent of the curable acrylate coating composition, and any range therebetween. In another embodiment, the hexafunctional acrylate derivative is present in an amount in the range of between about 15 weight percent and about 60 weight percent of the curable acrylate coating composition. In yet another embodiment of the present invention the hexafunctional acrylate derivative is present in an amount in the range of between about 20 and about 40 weight percent of the curable acrylate coating composition.

In one embodiment, the polyfunctional urethane acrylates have different, or distinct molecular weights. Preferably, the first polyfunctional urethane acrylate derivative has a molecular weight of at least 700, and preferably between the range of between about 700 and about 2000. In yet another embodiment, the first polyfunctional urethane acrylate has a molecular weight of about 900 to about 1100. Any additional polyfunctional urethane acrylate derivatives have a molecular weight of less than 700, preferably in the range of from about 100 to about 800. The additional polyfunctional urethane acrylate derivatives preferably have a molecular weight of about 156 to about 700. It is not a requirement that each of the polyurethane acrylate deriviatives have different molecular weights. Each of the polyurethane acrylates may have the same, or similar molecular weight, and includes molecular weights of about 150 to about 1100 and any individual or combination of weights therebetween.

The photoinitiators present in the curable acrylate coating composition include carbonyl compounds such as benzoin, benzoin methyl ether, benzoin ethyl ether, benzoin propyl ether, benzion-n-butyl ether, benzoin isobutyl ether, acetoin, butyroin, toluoin, benzil, benzophenone, para methoxybenzophenone, 2,2-diethoxyacetophenone, alpha.-.alpha.-dimethoxy alpha.-phenylacetophenone, methylphenyl glyoxylate, ethyphenyl glyoxylate, 4,4'-bis-(dimethylaminobenzophenone), propiophenone, acetophenone, 1-hydroxycyclohexyl phenyl ketone, 2,2-diethoxyacetophenone, ethlphenylpyloxylate, phenanthraquinone, and 2-hydroxy-2-methyl-1-phenyl-propan-1-one; sulfur compounds such as tetramethylthiuram monosulfide and tetramethylthiuram disulfide; azo compounds such as azobisisobutyronitrile and azobis-2,4-dimethylvaleronitrile; and peroxide compounds such as benzoyl peroxide and di-tert-butyl peroxide, thioxanthone photoinitiators like 7-chlorothioxanthone, 2,4-diethylthioxanthone and 2,4-diisopropylthioxanthone and acylophosphine oxide photoinitiators for example acylophosphine oxide as represented by the formula (I)

(I)

wherein $R_1$, $R_2$ and $R_3$ each independently represent a $C_1$–$C_8$ alkyl or $C_1$–$C_8$ oxyalkyl group a phenyl, substituted phenyl, benzyl or substituted benzyl group and mixtures thereof. The substituted phenyl group may include, but is not limited to diphenyl(2,4,6-trimethylbenzoyl) phosphine oxide, benzoylidiethoxyphosphine oxide. In yet another embodiment of the present invention the photoinitiator comprises 2-hydroxy-2-methyl-1-phenylpropan-1-one; 2,4,6-trimethylbenzoyl-diphenyl-phosphine oxide.

Typically, the photoinitiator is present in an amount corresponding to between about 0.1 weight percent and about 10 weight percent of the total weight of the composition, or any range therebetween. In one embodiment, the photoinitiator is present in an amount corresponding to between about 1 weight percent and about 5 weight percent of the total weight of the composition. In an alternative embodiment, the photoinitiator is present in an amount corresponding to between about 2 percent and about 4 percent by weight based on the total weight of the composition comprising the plastic protective film.

Typically, the photoinitiator is activated by incident light having a wavelength between about 350 nanometers and about 420 nanometers. In certain embodiments the photoinitiator is activated by light having a wavelength between about 360 nm and about 400 nm. In other embodiments of the invention the photoinitiator is activated by light having a wavelength less than about 390 nm.

In one embodiment the method of the invention employs at least one solvent which does not readily dissolve the plastic substrate of interest. In various embodiments said solvent has a boiling point above about 35° C. in order to facilitate leveling of the coating upon application to the substrate. Suitable solvents of this type include, but are not limited to, the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, and sulfoxide solvents. In another particular embodiment the solvent is 1-methoxy-2-propanol. Generally, the concentration of the solvent in the coating solution is about 10 weight percent to about 60 weight percent, preferably, between about 20 weight percent and about 40 weight percent, or any range therebetween.

A nanoscale filler is also present in the curable acrylate coating. The fillers are nanoscale size, having a particle size small enough not to scatter visible light. Preferably, the fillers have a particle size of no greater than 250 nanometers (nm). In one embodiment, the particle size is preferably between about 10 nanometers and about 100 nanometers, or any range therebetween. In yet another embodiment of the present invention the particle size is between about 15 nanometers and about 50 nanometers. As indicated earlier, alternative ranges include any subset therebetween.

Examples of materials suitable for use as nanoscale fillers include, but are not limited to silica, zirconia, titania, ceria, alumina, antimony oxide, and mixtures thereof. In one embodiment of the present invention the nanoscale filler additionally comprises organic functional groups. The organic functional groups include acrylates comprising structural units corresponding to structures (II):

(II)

wherein R is hydrogen, methyl, or ethyl.

In another embodiment of the present invention the nanoscale filler is acrylate functionalized silica. The acrylate functionalized silica can be produced by adding an acrylate functional alkoxy silane such as acryloxypropyl trimethoxysilane, methacryloxypropyl trimethoxysilane, acryloxypropyl trimethoxysilane, or methacryloxypropyl trimethoxysilane and mixtures thereof to an aqueous silica colloid, heating the mixture to promote hydrolysis of the silane and condensation of silanol groups present on the silica nanoparticles with silanol groups or alkoxysilane groups of the acrylate functional silanes, and exchanging the aqueous phase with an organic phase by vacuum stripping. Replacement of the aqueous phase with an organic phase is necessary to allow solution blend of the functionalized silica particles with the other coating components. Suitable materials for the organic phase may be acrylates or organic solvents with a boiling point higher than that of water.

The amount of nanoscale filler in the curable acrylate coating composition may be adjusted depending upon the desired useable life and the required property such as adhesion, abrasion resistance, good weather and thermal crack resistance to name a few. The nanoscale filler in the curable acrylate coating composition is present in an amount of about 1 weight percent to about 65 weight percent based upon the total weight of the curable coating composition. In one embodiment the nanoscale filler is present in an amount of about 1 to about 40 weight %, with about 3 to about 35 weight % preferred, about 5 to about 30 weight % more preferred, and about 15 weight % even more preferred, or any range therebetween.

The curable acrylate coating composition may optionally contain light stabilizers or UV absorbers. These materials will be included in varying amounts in accordance with the particular use or application desired. When included, their amounts will be sufficient to provide increased weatherability yet still obtain adequate cure response for the composition. In one embodiment the ultra violet absorbers include hydroxybenzophenones; benzotriazoles; cyanoacrylates; triazines; oxanilide derivatives; poly(ethylene naphthalate); hindered amine; formamidines; cinnamates; malonate derivatives and mixtures thereof. Examples of UV-visible absorbers which may be useful according to the method of the present invention include 2-(2'-hydroxy-5'-methylphenyl)benzotriazole; 2-(3'-tert-butyl-2'-hydroxy-5'-methylphenyl)-5-chlorobenzotriazole; 2-(3',5'-di-tert-butyl-2'-hydroxyphenyl)-5-chlorobenzotriazole; 2,2'-dihydroxy-4,4'-dimethoxybenzophenone; 2-(4,6-diphenyl-1,3,5-triazin-2-yl)-5-(hexyloxy)-phenol; 2-(4,6-bis(2,4-dimethylphenyl)-1,3,5-triazin-2-yl-5-octyloxy)phenol; 2-(2'-hydroxy-5'-methylphenyl)benzotriazole; 2,4-dihydroxybenzophenone; 2,4,2',4'-tetrahydroxybenzophenone; 2-hydroxy-4-ocytyloxybenzophenone; 2-hydroxy-4-methoxybenzophenone; phenyl salicylate; phenyl benzoate 2-hydroxybenzophenone; 5-chloro-2-hydroxy-benzophenone; 2-hydroxy-4-n-octoxybenzo-phenone; 4-dodecyloxy-2-hydroxybenzophenone; 2-hydroxy-4-octadecyloxybenzophenone; 2,2'-dihydroxymethoxybenzophenone; 2,2'-dihydroxy-4-4-dimethoxybenzophenone; para tert-butylphenyl salicylate; p (1,1,3,3 tetramethylbutyl)phenyl salicylate; 3-hydroxyphenyl benzoate; phenylene-1,3-dibenzoate; 2-(2-hydroxy-5-methylphenyl)benzotriazole; 2-(2-hydroxy-5-tertbutylphenyl)-5-chlorobenzotri azole; 2-( 2-hydroxy-3,5-di-tert-butylphenyl)benzotriazole; 2-(2-hydroxy-5-tert-butylphenyl)benzotriazole; 2-(2-hydroxy-4-octyloxyphenyl)benzotriazole and mixtures thereof.

In one embodiment the curable acrylate coating composition may also optionally contain various additives such as flattening agents (e.g BYK-353, available from BYK-Chemie), surface active agents (e.g. BYK-Siclean 3700, available from BHK-Chemie), thixotropic agents (e.g. Cellulose acetate butyrate, available from Aldrich Chemicals), and the like, and reaction products and combinations comprising at least one of the foregoing additives.

The curable acrylate coating composition could be coated on to articles employing conventional coating techniques. These may include, for example, flow coating, dip coating, roll coating, spray coating, or drawing down the coating onto the substrate using a doctor blade.

EXAMPLES

The following examples are set forth to provide those of ordinary skill in the art with a detailed description of how the methods claimed herein are one aspect of the present invention may be carried out and evaluated, and are not intended to limit the scope of what the inventors regard as their invention. Table 1 exemplifies various materials used in the following examples of the present invention.

TABLE 1

| Trade Name | Chemical Composition | Manufacturer |
| --- | --- | --- |
| EB1290 | Hexafunctional Urethane Acrylate | UCB Chemical |
| EB8301 | Hexafunctional Urethane Acrylate | UCB Chemical |
| SR444 | Pentaerythritol triacrylate | Sartomer Company |
| SR399 | Dipentaerythritol pentaacrylate | Sartomer Company |
| SR351HP | Trimethylolpropane triacrylate | Sartomer Company |
| SR213 | 1,4-butanediol diacrylate | Sartomer Company |
| EB140 | Tetraacrylate monomer | UCB Chemical |
| EB1140 | Polyester acrylate oligomer | UCB Chemical |
| SR355 | Di-trimethylolpropane tetraacrylate | Sartomer Company |
| SR494 | Ethoxylated Pentaerythritol Tetraacrylate | Sartomer Company |
| CN981 | Difunctional urethane acrylate | Sartomer Company |
| CN983 | Difunctional urethane acrylate | Sartomer Company |
| TRPGDA | Tripropylene glycol diacrylate | Sartomer Company |
| SR454HP | Ethoxylated trimethylolpropane triacrylate | Sartomer Company |
| SR350 | Trimethylolpropane trimethacrylate | Sartomer Company |
| Darocur 4265 | 50/50 mixture of 2,4,6-trimethylbenzoyl-diphenyl-phosphine oxide and 2-hydroxy-2-methyl-1-phenyl-propan-1-one | Ciba |
| Dowanol PM | 1-methoxy-2-propanol | Aldrich |
| Lumogen F Red | Proprietary | BASF |
| FCS100 | Methacrylate functional silica nanoparticles | GE Silicones |

Example 1

Method for preparing the coating. The coatings were prepared by the following steps: automated deposition of multiple liquid coatings onto a substrate in an array format, spreading of the liquid across the substrate using centrifugal force, and curing of the array with UV light.

10 milliliter stock solutions of hexafunctional urethane acrylate (EB1290) and pentaerythritol triacrylate (SR444) in 1-methoxy-2-propanol (0.2 grams of each acrylate per milliliter), DAROCUR 4365 (0.02 gram per milliliter) and FCS100 (0.1 gram per milliliter) were prepared. In addition, a 100 milliliter stock solution of Lumogen F Red was prepared, having a concentration of 0.0001 gram per milliliter in 1-methoxy-2-propanol. A PACKARD MULTIPROBE II EX robotic liquid handling system was employed to prepare the coatings. The robot was programmed such that each coating contained the composition shown in Table 2 when all of the solvent was evaporated from the coating. The solids content of each coating solution was adjusted by the robotic addition of sufficient 1-methoxy-2-propanol such that a 25 microliter aliquot of the coating solution produced a 10 micron thick coating. The coating solution was mixed by repeatedly aspirating and dispensing each coating into its container. A 0.3 milliliter aliquot of each coating solution was transferred to a 48 well titerplate using the liquid handling robot. The coating solution was then transferred by the liquid handling robot from the titerplate to a substrate made of polycarbonate film having dimensions 13 cm by 9 cm by 15 mil, the surface of said polycarbonate film being subdivided into 48 circular "wells" having a diameter of 9 mm by a silicone rubber template having dimensions 0.3 cm thick, 12.4 cm long, and 8.2 cm wide. The wells were configured as a regular 8×6 array. The wells created on the surface of the polycarbonate substrate by the silicone rubber template helped to confine the coating solutions dispensed on the substrate.

TABLE 2

| Raw Material | Wt. % |
| --- | --- |
| Hexafunctional urethane acrylate (EB1290) | 38.499 |
| Pentaerythritol triacrylate (SR444) | 38.498 |
| FCS100 (functionalized colloidal silica from GE Silicones) | 20 |
| Darocur 4265 (photoinitiator from Ciba) | 3 |
| Lumogen F Red (florophore from BASF) | 0.003 |

The array of liquid coatings on the substrate equipped with the silicone rubber template was placed in an centrifuge (the Omega Coater as described in U.S. Publication No. U.S.20030134033A1; EP1242192 A1; WO0133211 A1; and WO013230 A1]) which spun the entire array at high speed to spread the liquid across the substrate within the confines of the individual wells. This produced coated areas 9 mm in diameter with uniform thickness. The array of coatings was then cured using a FUSION EPIC 6000 UV Processor. The distance from the lamp to the substrate was 4 inches, the belt speed was 11 ft/min and the array was passed under the lamp twice. After curing, the silicone rubber template was peeled from the polycarbonate substrate producing an array of 48 coatings on the polycarbonate.

Similar methods were employed to make curable acrylate coating compositions comprising hexafunctional urethane acrylate (EB1290) with 1,4-butanediol diacrylate and hexafunctional urethane acrylate (EB1290) with timethyylolpropane trimethacrylate (SR350).

Example 2

The adhesion of the cured coatings to the polycarbonate substrate was measured using a modified version of ASTM procedure D3359. A robot was used to inscribe a crosshatch pattern onto each of the coatings. To each row of 8 coatings, Scotch Brand™ premium grade transparent cellophane tape from 3M was applied and then quickly ripped off without jerking at an angle of 180°. The amount of coating removed was determined using fluorescence microscopy, the contrast between the coating and the substrate being determined. The Lumogen F Red present in small amounts in the coatings strongly fluoresced when the coatings were illuminated at a wavelength of about 500 nm. Each coating in the array was observed using the microscope and rated according to ASTM D 3359 based on the amount of coating removed.

Example 3

Abrasion testing of the coatings was conducted by abrading the entire array of coatings using a Glas-Col Multipulse shaker. The coating array was taped to the bottom of a tray with the array positioned in the center of the tray, and 1000 ml of quartz sand obtained from Global Drilling Supply (#4 Sand, Quartz) was poured on top of the array. The tray containing the array and sand was then oscillated in a circular motion at a speed setting of 50. Unless specified otherwise, the oscillation time was 20 minutes.

The degree of abrasion was measured from the intensity of scattered light using as described in U.S. Pat. No. 6,538,725. The instrument employed included a white light source (450-W Xe arc lamp, SLM Instruments, Inc., Ubrbana, Ill., Model FP-024), a monochromator for wavelength selection (SLM Instruments Inc., Model FP-092), and a portable spectrofluorometer (Ocean Optics, Inc., Dunedin, Fla., Model ST2000). The spectrofluorometer was equipped with a 200-$\mu$m slit, 600-grooves/mm grating blazed at 400 nm and covering the spectral range from 250 to 800 nm with efficiency greater than 30%, and a linear CCD-array detector. White light was focused into one of the arms of a "six-around-one" bifurcated fiber-optic reflection probe (Ocean Optics, Inc., Model R400-7-UV/VIS) and 360° back-scattered light detected from another probe arm of the fiber bundle.

The array was mounted onto a programmable X-Y translation stage that automatically positioned each coating under the probe to allow the spectrum of scattered light to be detected. Abrasion resistance was determined by comparing the intensity of scattered light for each sample. The greater the intensity of scattered light, the poorer the abrasion resistance. Table 3 indicates the various coating compositions of urethane acrylate and pentaerythritol triacrylate that were evaluated for abrasion resistance using high throughput abrasion test with an oscillation time of ten minutes.

TABLE 3

|  | CEx 1 | CEx 2 | Ex 1 | Ex 2 | Ex 3 | Ex 4 | Ex 5 |
| --- | --- | --- | --- | --- | --- | --- | --- |
| EB1290 | 76.997 | — | 61.6 | 46.2 | 30.8 | 15.4 | 5.0 |
| SR444 | — | 76.997 | 15.397 | 30.797 | 46.197 | 61.597 | 71.997 |
| FCS100 | 20 | 20 | 20 | 20 | 20 | 20 | 20 |
| Darocur 4265 | 3 | 3 | 3 | 3 | 3 | 3 | 3 |
| Lumogen F Red | 0.003 | 0.003 | 0.003 | 0.003 | 0.003 | 0.003 | 0.003 |

CEx = Comparative example;
Ex = Examples

Figure 1:
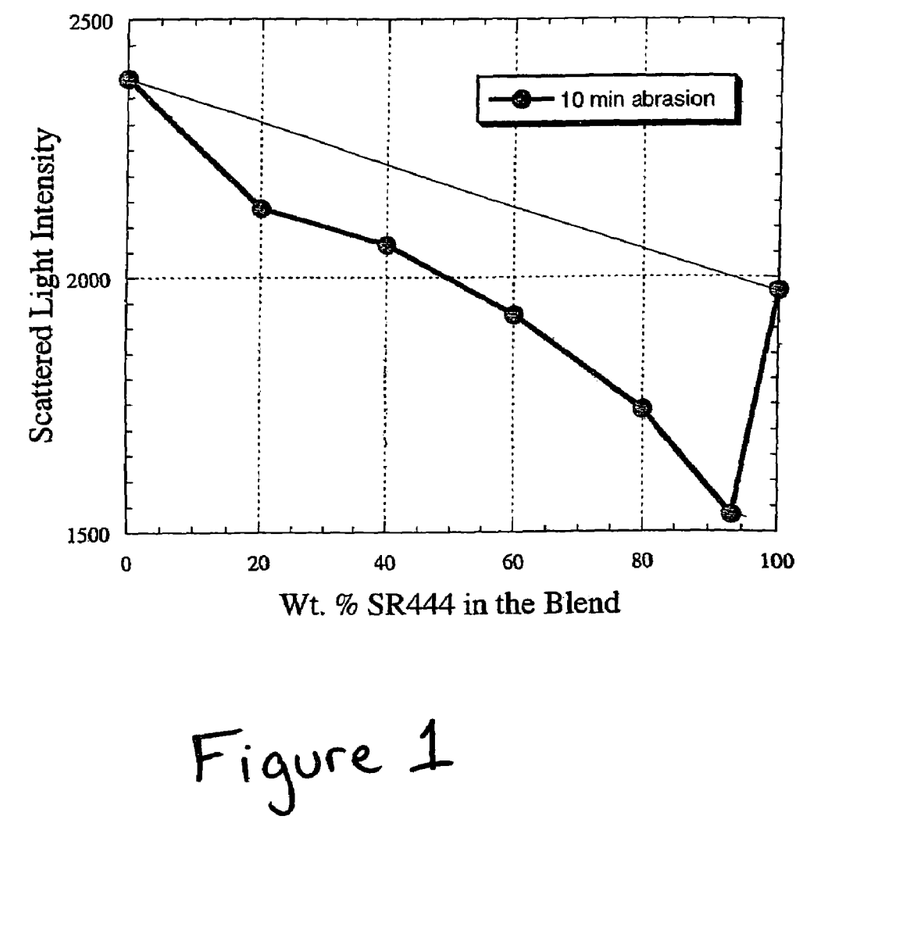
FIG. 1 is a graphical representation of abrasion resistance based on weight percent of pentaerythritol triacrylate.
Figure 2:
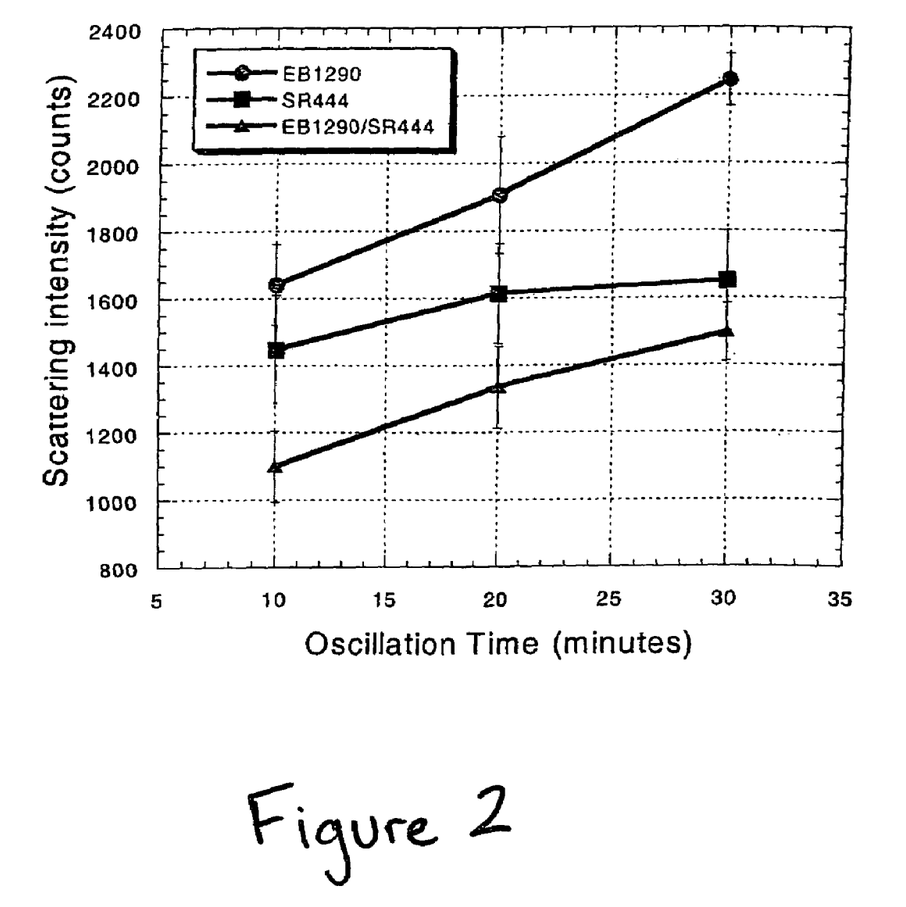
FIG. 2 is a graphical representation of abrasion resistance of two individual polyfunctional acrylates and a blend of two polyfunctional acrylates.

It can be noticed from FIG. 1, that in the coating compositions comprising urethane acrylate and pentaerythritol triacrylate as the weight percent of pentaerythritol triacrylate increases the abrasion resistance is high. The coatings were found to possess better abrasion resistance than that of the two acrylate materials used alone. The abrasion resistance of the coatings were evaluated using a high throughput abrasion test wherein the array of the coatings were first abraded for ten minutes and the intensity of scattered light was measured. An additional abrasion was carried out for ten more minutes, which was followed by a final measure of the intensity of the scattered light. The abrasion resistance of the coatings based in the blend of urethane acrylate and pentaerythritol triacrylate was better than either of the coating containing only urethane acrylate or pentaerythritol triacrylate as the acrylate component indicating a synergist effect of the materials of the present invention as seen in FIG. 2.

Example 4

The urethane acrylate blended with pentaerythritol triacrylate was coated on to a LEXAN® sheet (GE Company) and subjected to abrasion test employing TABER abrasion test. In this method the original weight of the test sample was measured. The test sample was then placed on the abrasion tester. A load of 500 gram weight was placed on top of the abrader wheel and was allowed to spin for 500 cycles. The final weight was then recorded. As shown in FIG. 3, the LEXAN® sheet coated with a blend of polyfunctional acrylates possessed better abrasion resistance than those coated with single acrylate coatings.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A curable acrylate coating composition comprising at least two polyfunctional acrylate derivatives, and at least one of said polyfunctional acrylate derivatives comprises a hexafunctional acrylate derivative;
   a photoinitiator; and
   a nanoscale filler.

2. The curable acrylate coating composition according to claim 1 wherein said at least two polyfunctional acrylate derivatives are selected from a group consisting of hexafunctional urethane acrylates, dipentaerythritol pentaacrylate, ethoxylated pentaerythritol tetraacrylate, di-trimethylolpropane tetraacrylate, pentaerythritol triacrylate, trimethylolpropane triacrylate, ethoxylated trimethylolpropane triacrylate, butanediol diacrylate, tripropylene glycol diacrylate, trimethylolpropane trimethacrylate, difunctional urethane acrylates, tetraacrylate monomer, polyester acrylate oligomers, and combinations thereof.

3. The curable acrylate coating composition according to claim 1 wherein the polyfunctional acrylate derivatives are present in an amount such that the total amount of all polyfunctional acrylates present corresponds to between about 30 and about 95 percent by weight of the curable acrylate coating composition.

4. The curable acrylate coating composition according to claim 3 wherein the polyfunctional acrylate derivatives are present in an amount such that the total amount of all polyfunctional acrylates present corresponds to between about 50 and about 90 percent by weight of the curable acrylate coating composition.

5. The curable acrylate coating composition according to claim 1 wherein said hexafunctional acrylate derivative is present in an amount corresponding to between about 0.1 and about 30 percent by weight of the curable acrylate coating composition.

6. The curable acrylate coating composition according to claim 1 wherein said coating composition further comprises a solvent selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, sulfoxide solvents.

7. The curable acrylate coating composition according to claim 6 wherein said solvent is 1-methoxy-2-propanol.

8. The curable acrylate coating composition according to claim 1 wherein said photoinitiator is activated by light having a wavelength of less than about 420 nm.

9. The curable acrylate coating composition according to claim 1 wherein said photoinitiator comprises 2,4,6-trimethylbenzoyl-diphenyl-phosphine oxide; and 2-hydroxy-2-methyl-1-phenylpropan-1-one.

10. The curable acrylate coating composition according to claim 1 wherein said nanoscale filler is selected from the group consisting of silica, zirconia, titania, alumina, ceria, and mixtures thereof.

11. The curable acrylate coating composition according to claim 1 wherein said nanoscale filler has a particle size of about 10 nanometers to about 250 nanometers.

12. The curable acrylate coating composition according to claim 1 wherein said nanoscale filler has a particle size in the range of between about 15 and about 50 nanometers.

13. The curable acrylate coating composition according to claim 1 wherein said nanoscale filler comprises silica having organic functional groups.

14. The curable acrylate coating composition according to claim 13 wherein said nanoscale filler comprises an acrylate functionalized silica.

15. The curable acrylate coating composition according to claim 1 wherein said nanoscale filler is present in an amount corresponding to between about 2 and about 15 percent by weight of the coating composition.

16. The curable acrylate coating composition according to claim 1 further comprising a UV absorber selected from a group consisting of hydroxybenzophenones, benzotriazoles, cyanoacrylates, triazines, oxanilide derivatives, poly(ethylene naphthalate), hindered amine, formamidines, cinnamates, malonate derivatives and combinations thereof.

17. An article coated with the curable acrylate coating composition according to claim 1.

18. A curable acrylate coating composition comprising a photoinitiator, a nanoscale filler, at least one hexafunctional urethane acrylate, and at least one polyfunctional acrylate derivative.

19. The curable acrylate coating composition according to claim 18 wherein said hexafunctional urethane acrylate is a hexafunctional aliphatic urethane acrylate derivative.

20. The curable acrylate coating composition according to claim 18 wherein said at least one polyfunctional acrylate derivative is selected from a group consisting of 1,4-butanediol diacrylate, pentaerythitol triacrylate, trimethanol trimethacrylate derivatives and mixtures thereof.

21. The curable acrylate coating composition according to claim 18 wherein the at least one polyfunctional acrylate derivative is present in an amount such that the total amount of all polyfunctional acrylates present corresponds to between about 30 and about 95 percent by weight of the curable acrylate coating composition.

22. The curable acrylate coating composition according to claim 21 wherein the polyfunctional acrylate derivatives are present in an amount such that the total amount of all polyfunctional acrylates present corresponds to between about 50 and about 90 percent by weight of the curable acrylate coating composition.

23. The curable acrylate coating composition according to claim 18 wherein said hexafunctional acrylate derivative is present in an amount corresponding to between about 0.1 and about 30 percent by weight of the curable acrylate coating composition.

24. The curable acrylate coating composition according to claim 18 wherein said coating composition further comprises a solvent selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, sulfoxide solvents and mixtures thereof.

25. The curable acrylate coating composition according to claim 24 wherein said solvent is 1-methoxy-2-propanol.

26. The curable acrylate coating composition according to claim 18 wherein said photoinitiator is activated by light having a wavelength of less than about 420 nm.

27. The curable acrylate coating composition according to claim 26 wherein said photoinitiator comprises 2,4,6-trimethylbenzoyl-diphenyl-phosphine oxide; and 2-hydroxy-2-methyl-1-phenyl-propan-1-one.

28. The curable acrylate coating composition according to claim 18 wherein said nanoscale filler is selected from a group consisting of silica, zirconia, titania, alumina, and mixtures thereof.

29. The curable acrylate coating composition according to claim 28 wherein said nanoscale filler comprises silica having organic functional groups.

30. The curable acrylate coating composition according to claim 29 wherein said nanoscale filler comprises an acrylate functionalized silica.

31. The curable acrylate coating composition according to claim 18 wherein said nanoscale filler is present in an amount corresponding to between about 2 and about 15 percent by weight of the coating composition.

32. The curable acrylate coating composition according to claim 18 further comprising a UV absorber selected from a group consisting of hydroxybenzophenones, benzotriazoles, cyanoacrylates, triazines, oxanilide derivatives, poly(ethylene naphthalate), hindered amine, formamidines, cinnamates, malonate derivatives and combinations thereof.

33. A curable acrylate coating composition comprising a photoinitiator, a nanoscale filler, at least one hexafunctional urethane acrylate, and at least one additional polyfunctional acrylate derivative selected from the group consisting of 1,4-butanediol diacrylate, pentaerythitol triacrylate, and trinmethanol trimthacrylate derivatives and mixtures thereof.

* * * * *

UNITED STATES PATENT AND TRADEMARK OFFICE
CERTIFICATE OF CORRECTION

PATENT NO. : 6,998425 B2
APPLICATION NO. : 10/747713
DATED : February 14, 2006
INVENTOR(S) : Bret Ja Chisholm et al.

It is certified that error appears in the above-identified patent and that said Letters Patent is hereby corrected as shown below:

In Col. 12, line 31, at the only instance thereof, replace "trinmethanol trimthacrylate" with -- trimethanol trimethacrylate --.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,998,425 B2
APPLICATION NO. : 10/747713
DATED : February 14, 2006
INVENTOR(S) : Bret Ja Chisholm et al.

It is certified that error appears in the above-identified patent and that said Letters Patent is hereby corrected as shown below:

Column 12
In claim 33, line 6, at the only instance thereof, replace "trinmethanol trimethacrylate" with -- trimethanol trimethacrylate --.

Signed and Sealed this

Fifteenth Day of May, 2007

JON W. DUDAS
*Director of the United States Patent and Trademark Office*